United States Patent [19]

Lacomme

[11] 4,297,703
[45] Oct. 27, 1981

[54] TELEMETRY DEVICE FOR TRACKING RADAR AND RADAR SYSTEM COMPRISING SUCH A DEVICE

[75] Inventor: Philippe Lacomme, Paris, France

[73] Assignee: Thomson-CSF, Paris, France

[21] Appl. No.: 100,143

[22] Filed: Dec. 4, 1979

[30] Foreign Application Priority Data

Dec. 5, 1978 [FR] France ............................. 78 34225

[51] Int. Cl.³ .............................................. G01S 13/70
[52] U.S. Cl. .................................. 343/7.3; 343/5 DP
[58] Field of Search ............................. 343/5 DP, 7.3

[56] References Cited

U.S. PATENT DOCUMENTS

| 3,246,324 | 4/1966 | Price. | |
|---|---|---|---|
| 3,354,455 | 11/1967 | Briggs et al. | 343/7.3 |
| 3,376,504 | 4/1968 | Chick | 343/5 DP X |
| 3,660,845 | 5/1972 | Petterson | 343/7.3 X |
| 3,716,858 | 2/1973 | Worthington | 343/7.3 |
| 3,820,119 | 6/1974 | Casse et al. | |

FOREIGN PATENT DOCUMENTS 1102962 2/1968 United Kingdom.

OTHER PUBLICATIONS

IEEE Transactions on Geoscience Electronics: vol. GE-8, No. 1, Jan. 1970, New York, U. S. Lindren et al., "Theory and Noise Dynamics of the Delay-Locked Loop", pp. 30-40.

Primary Examiner—T. H. Tubbesing
Attorney, Agent, or Firm—Cushman, Darby & Cushman

[57] ABSTRACT

The invention relates to a radar telemetry device.

The device comprises a first loop for the distance tracking of a moving echo comprising a detector for the position deviation of an echo signal and a telemetry mark, means for the digital calculation of the distance of the echo, means for generating clock pulses and means for generating a reference tracking window by the adding-subtracting of clock pulses. A second analog loop connecting the output of the add-subtract counting means to the deviation detector ensures a time filtering of the reference tracking window.

7 Claims, 4 Drawing Figures

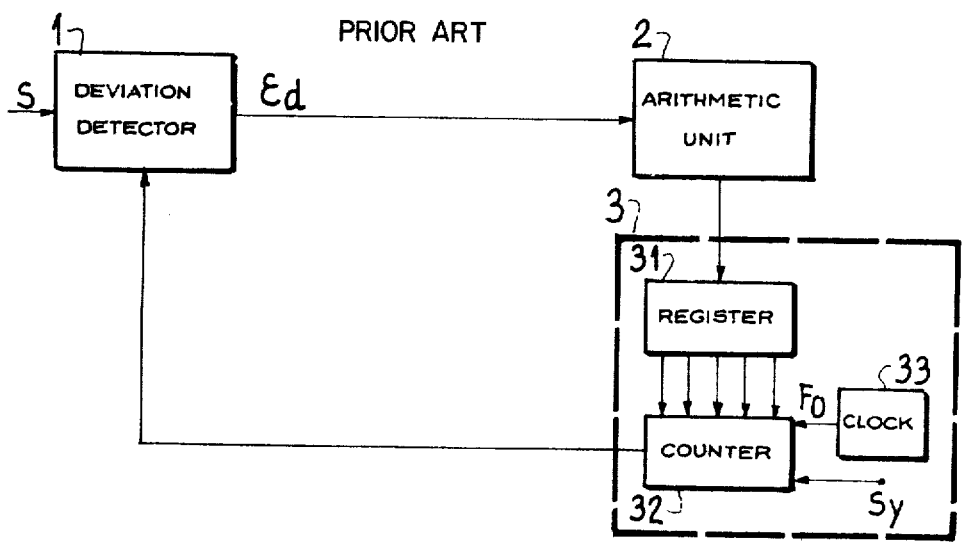
FIG_1 PRIOR ART
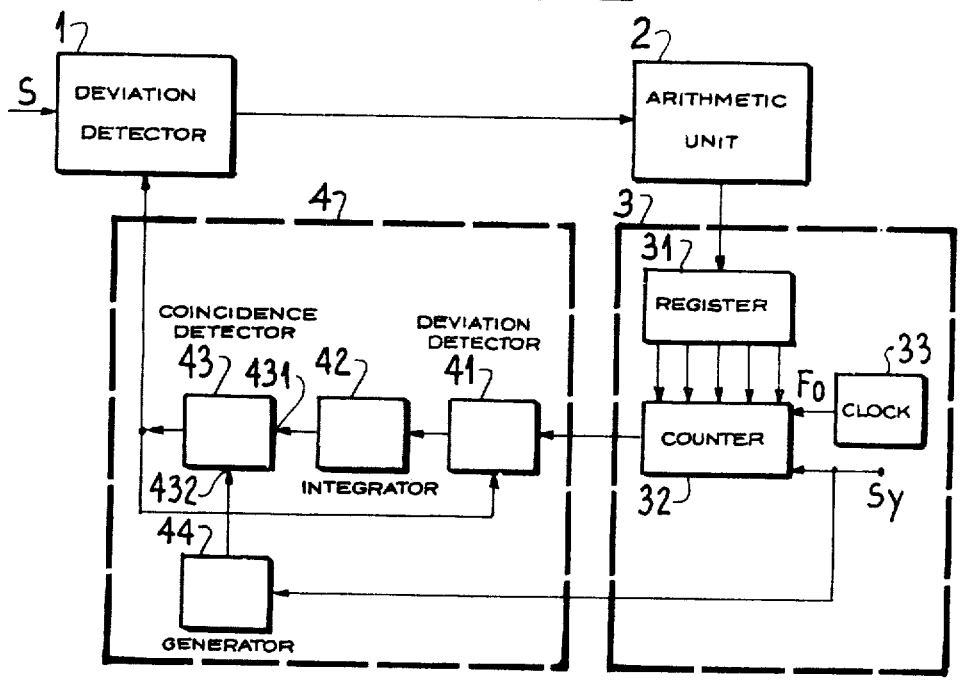
FIG_2

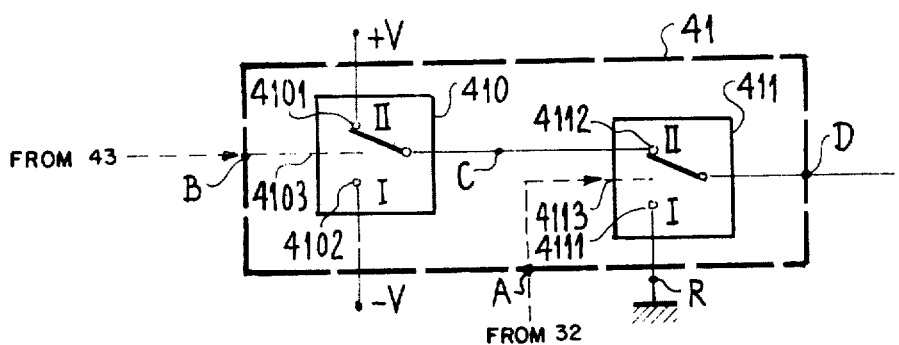
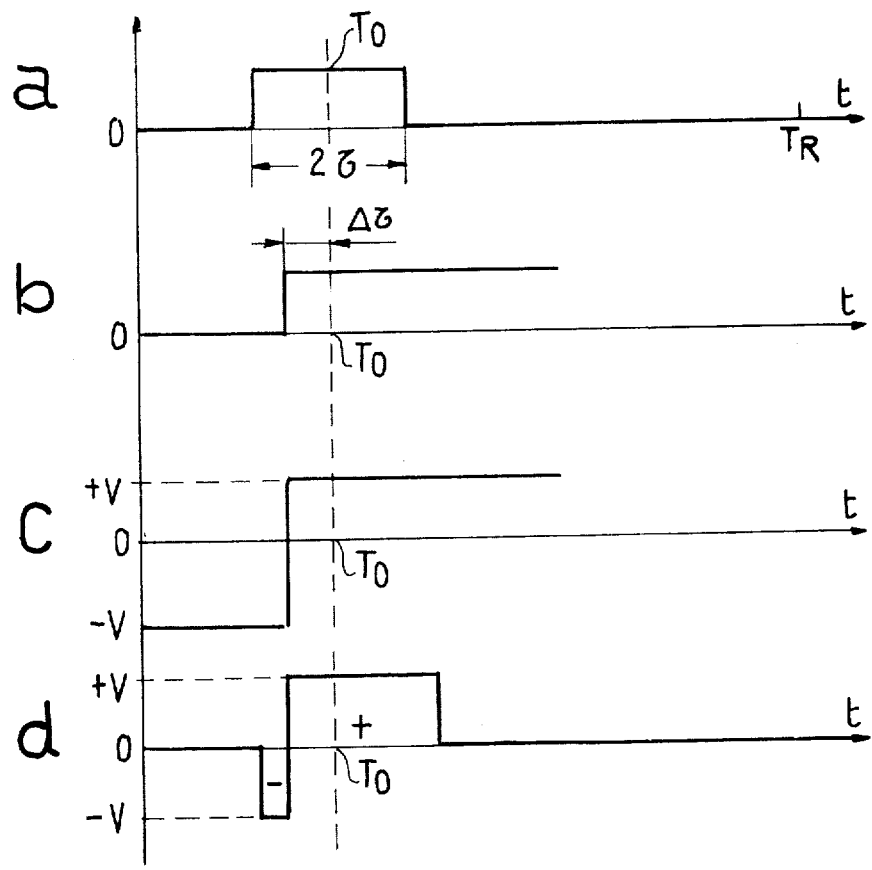

TELEMETRY DEVICE FOR TRACKING RADAR AND RADAR SYSTEM COMPRISING SUCH A DEVICE

BACKGROUND OF THE INVENTION

The invention relates to a telemetry device for tracking radar and to the radar system comprising such a device.

In telemetry systems for conventional tracking radar means the telemetry circuits making it possible to measure the distance from a target echo and to ensure the tracking of such an echo by a telemetry mark permitting the production of a tracking window can be constituted by digital circuits. Such circuits are shown in FIG. 1 and comprise an arithmetic unit 2 which calculates the true distance of the echo from distance error information ed or the displacement between the position of the echo signal and the tracking window produced by a variation or deviation detector 1. This distance is expressed, for example, in the time lag of the telemetry mark compared with the transmission pulse of the radar, when the latter is a pulse radar. To this end the deviation detector is supplied with a telemetry mark or a reference tracking window by on the one hand the video frequency signal of radar S and on the other by a generator system 3.

The generator system of the telemetry mark generally comprises a digital register 31 and an add-subtract counter 32 initially loaded before the start of each recurrence by means of the digital register 31 to the value of the distance expressed in delay time calculated by the arithmetic unit 2. The add-subtract counter 32 is supplied from the synchronisation signal $S_y$ triggered by the radar transmission signal by a very stable clock 33, for example in frequency pulses Fo. When N pulses have been subtracted by the add-subtract counter 32 the zeroing of the counter supplies a pulse constituting the telemetry mark to the deviation detector 1. The telemetry mark has a lag of N/Fo compared with the transmission pulse representing the distance position of the echo, the distance tracking window being, for example, produced at the deviation detector 1 for sampling the video signal S.

However, such a device has the disadvantage of supplying a telemetry mark whose lag or position suffers from a quantification error equal to a distance element corresponding to a time interval between two clock pulses, i.e. an error equal to the value 1/Fo. This quantification error in devices using the distance tracking window takes the form of a position uncertainty which causes jitter. This position jitter is particularly prejudicial to the elimination of fixed echos of tracking radar systems indicating moving targets, called MTI radar systems, because it leads to noise, whose amplitude has a detrimental influence on the Doppler filtering.

One solution for the above problem involves increasing the clock frequency Fo in order to reduce the quantification error. For an elimination level of the fixed errors τEEF the tolerable jitter is substantially given by the ratio τ/τEEF, in which τ is the duration of the pulse transmitted by the radar, which leads to the choice of a very high clock frequency Fo, for example Fo=200 MHz for 0.5 μs and τEEF=40 dB.

Thus, the methods for producing the telemetry mark system are very difficult to perform and are also very costly.

BRIEF SUMMARY OF THE INVENTION

One object of the present invention is to provide a telemetry device, whose telemetry mark position jitter is compatible with a distance tracking, although the clock pulse frequency is maintained at a value below a few dozen megahertz.

Another object of the present invention is to provide a telemetry device having a time filtering of the telemetry mark lag, which is representative of the distance information of a useful echo.

According to the invention the tracking radar telemetry device has a first distance tracking loop for a moving echo signal comprising a detector supplying a position deviation signal for the moving echo signal and a telemetry mark. A digital computer makes it possible to calculate the distance of the echo signal from the moving echo signal and the telemetry mark. A clock produces pulses of given frequency and a generator system makes it possible to produce a reference tracking window by adding-subtracting the clock pulses. The device also comprises a second analog loop connecting the output of the generator system of the reference tracking window to the deviation detector. This second loop ensures a time filtering in distance of the tracking window.

Such a telemetry device is particularly suitable for use in airport MTI radar systems, the realisation of the object of the invention only requiring a small number of additional components and conventional circuits compared with prior art digital telemetry systems.

BRIEF DESCRIPTION OF THE DRAWINGS

The invention will be described in greater detail hereinafter relative to non-limitative embodiments and with reference to the attached drawings, with the exception of FIG. 1 which shows a prior art digital telemetry system.

FIG. 2 shows a functional diagram of the device according to the invention.

FIG. 3 shows a block diagram of a detail of the invention according to FIG. 2.

FIG. 4 shows at a, b, c, d a diagram of the times at the different points A, B, C, D of the device as shown in FIG. 3.

DETAILED DESCRIPTION OF THE PREFERRED EMBODIMENTS

According to FIG. 2 the tracking radar telemetry device according to the invention comprises, as described hereinbefore, a position deviation detector 1 for an echo signal S and a telemetry mark, digital computing means 2 for the echo distance and generating means 3 for a reference tracking window by adding-subtracting the pulses of a clock 33 of given repetition frequency Fo. The device also has a second analog loop 4 inserted in the first tracking loop. The second analog loop connects the output of the generating means 3 of the reference tracking window and more specifically the add-subtract counter 32 to the position deviation detector 1 of the echo signal and the telemetry mark. The second analog loop 4 supplies to the position deviation detector 1 the telemetry mark after filtering the reference tracking window position, whose quantification noise or jitter is considerably attenuated.

According to a non-limitative embodiment of the invention shown in FIG. 2 the second analog loop has on the one hand, connected in cascade, a deviation detector 41 for the telemetry mark and the reference tracking window, integrating means 42 receiving the signal supplied by the deviation detector 41 of the telemetry mark and the reference tracking window and a coincidence detector 43 receiving at a first input 431 the signal supplied by the integrating means 42. The second analog loop also has a synchronised sawtooth generator 44 supplying a comparison signal to a second input 432 or comparison input of the coincidence detector 43. The synchronised generator 44 receives synchronisation signals $S_y$ of the radar transmission pulses supplied by radar transmission circuits, not shown in FIG. 2. The coincidence detector 43 has an output which is on the one hand connected to the input of the position deviation detector 1 of the echo signal and the distance tracking window and on the other to the deviation detector 41 of the telemetry mark and the reference tracking window.

The device shown in FIG. 2 functions in the following manner:

The telemetry mark and reference tracking window deviation detector 41 supplies a signal which is representative of the position variation between the reference tracking window and the telemetry mark supplied by the second analog tracking loop. The integrating means 42 constituted, for example, by a conventional analog integrator supply a signal which is representative of the echo distance in the case of coincidence of the telemetry mark and the reference tracking window, said signal being proportional to the position variation between the reference tracking window and the telemetry mark. The sawtooth generator 44 supplies a voltage gradient triggered off by the radar transmission synchronisation signal. The sawtooth generator 44 is a conventional generator which is well known to one of ordinary skill in the art.

The coincidence detector 43 serves as a telemetry mark generator in the case of coincidence of the levels of the sawtooth signal and the signal supplied by the integrator. The telemetry mark supplied at the output of the second analog loop is used in the deviation detector 1 for triggering off the distance tracking window, which ensures the sampling of the video frequency signal and at the deviation detector 41 for measuring the position variation between the reference tracking window and the telemetry mark. The operation of the second analog loop is similar to the operation of a conventional analog telemetry loop comprising an integrator in which the video signal from the receiver is replaced by the reference tracking window from the digital computer.

As the precision of the linearity and zero position are ensured by the reference tracking window, the characteristics of the second analog loop are selected so as to optimise jitter reduction. Thus, the jitter reduction ratio, which is a function of the ratio between the calculating speed of the counter 32 and the pass band of the second analog loop can be chosen as approximately 10, by the simple choice of the time constant of the integrator which determines the pass band of the second analog loop. The pass band of the second analog loop is fixed at approximately 10 times the pass band of the complete loop, in order not to reduce the stability of the complete device.

According to the embodiment of the invention shown in exemplified manner in FIG. 3 the deviation detector 41 for the telemetry mark and the reference tracking window has first commutating means 410 having two commutation terminals 4101, 4102, respectively supplied by two opposed d.c. voltage sources $+V$ and $-V$. The first commutating means comprise on the one hand a control input 4103 receiving in operation the telemetry mark from detector 43 and, on the other hand, an output terminal supplying a first commutating signal. The deviation detector 41 also has second two-position commutating means 411, whose commutating terminals 4111 and 4112 are respectively supplied by the reference voltage R of the device and by the first commutating signal. These second commutating means 411 receive the reference tracking window from counter 32 at a control input 4113.

The device shown in FIG. 3 functions as follows, taking account of the time diagrams at test points A, B, C, D of FIG. 3 and shown in FIG. 4.

At point A the reference tracking window supplied by the counter 32 is represented by a pulse of duration $2\tau$ centered relative to a time To representative of the distance of the echo relative to the origin of time 0 for the start of a recurrence of radar transmission of duration TR.

At point B the coincidence of the sawtooth signal produced by the sawtooth generator 44 and the signal of integrator 42 produces the telemetry mark, whose displacement relative to time To is measured by the quantity $\Delta\tau$.

Before the pulse of duration $2\tau$ of the reference tracking window the first and second commutating means are in position I and the signal supplied at D is zero, whilst the signal at C is equal to $-V$.

The pulse of duration $2\tau$ of the reference tracking window brings the second commutating means into position II and the signal at D becomes equal to $-V$ until the telemetry mark pulse appears at B and this leads to the commutation of the first commutating means at II and the passage to the value $+V$ of the signal supplied at D by deviation detector 41. The integration by the integrator of the signal supplied at D by deviation detector 41 provides a direct measure of the distance of the echo in the case of coincidence of the telemetry mark pulse and time To, representative of the distance of the echo relative to the origin 0 of the recurrence of the transmission in question.

The jitter due to the quantification leads to a variation in time To around an average value. The signal at the output of integrator 42 is then such that the position of the telemetry mark copies this average position with a much lower jitter than the initial jitter, the integrator carrying out a filtering of the position of said telemetry mark.

According to a special non-limitative embodiment of the invention the deviation detector 41 is constituted by an analog gate having at least two control inputs receiving respectively in operation the pulse representative of the telemetry mark and the reference tracking window and two polarisation inputs receiving opposite d.c. voltages $+V$ and $-V$. In an exemplified and non-limitative manner the analog gate is constituted by an integrated circuit known under the trade name DG 190.

What is claimed is:

1. A telemetry device for a tracking radar, comprising:
   a first loop for tracking the distance of a moving echo, including
   a first deviation detector for detecting the position deviation of an echo signal and a telemetry mark;

digital calculation means for calculating the distance of the echo;

means for generating clock pulses having a predetermined repetition frequency; and generating means for providing a reference tracking window by adding or subtracting clock pulses; and a second analog loop, within the first loop and coupling the output of the generating means to an input of the position deviation detector, the second analog loop including in cascade a second deviation detector for detecting the deviation of the telemetry mark and the reference tracking window, an integrator for integrating the signal supplied by the deviation detector for the telemetry mark and the reference tracking window, a coincidence detector receiving at a first comparison input the signal supplied by the integrator, and a synchronised sawtooth generator which supplies a comparison signal to a second comparison input of the coincidence detector which, in the case of coincidence, supplies a pulse representative of the telemetry mark to the first position deviation detector and to the second deviation detector.

2. A telemetry device according to claim 1, wherein the deviation detector of the telemetry mark and the reference tracking window has first two-position commutating means, whose commutating terminals are respectively supplied by two opposite d.c. voltages, the first commutating means comprising a control input receiving in operation the pulse representative of the telemetry mark and an output terminal supplying a first commutating signal and second two-position commutating means, whose commutating terminals are respectively supplied by the reference voltage of the device and by the first commutating signal, the second commutating means comprising a control input receiving in operation the reference tracking window, whilst the second commutating circuit has an output terminal supplying a signal representative of the variation between the telemetry mark and the reference tracking window.

3. A radar telemetry device according to claim 2, wherein the deviation detector of the telemetry mark and the reference tracking window is constituted by an analog gate having at least two control inputs respectively receiving in operation the pulse representative of the telemetry mark and the reference tracking window and two polarisation inputs receiving the opposed d.c. voltages $+V$ and $-V$.

4. A telemetry device for tracking radar comprising:

a first loop for tracking the distance of a moving echo comprising a first deviation detector for determining the position deviation of an echo signal and a telemetry mark, means for the digital calculation of the distance of the echo, means for generating clock pulses of a predetermined repetition frequency, and generating means for providing a reference tracking window by adding-subtracting clock pulses, and a second analog loop, connected in said first loop between the generating means for providing a reference tracking window and the position deviation detector providing a time filtering in distance of the reference tracking window.

5. A telemetry device according to claim 4, wherein the second analog loop for filtering the reference tracking window position comprises, connected in cascade:

a second deviation detector for detecting the deviation between the telemetry mark and the reference tracking window, an integrator receiving the signal supplied by the deviation detector for the telemetry mark and the reference tracking window, and a coincidence detector receiving at a first comparison input the signal supplied by the integrator, the second analog loop having a synchronized sawtooth generator which supplies a comparison signal to a second comparison input of the coincidence detector, the coincidence detector providing a pulse representative of the telemetry mark to the first position deviation detector and to the second deviation detector.

6. A telemetry device according to claim 5, wherein the second deviation detector comprises:

a first two-position commutating means, whose commutating terminals are respectively supplied by two opposite d.c. voltages, the first commutating means comprising a control input receiving in operation the pulse representative of the telemetry mark and an output terminal supplying a first commutating signal and a second two-position commutating means, whose commutating terminals are respectively supplied by the reference voltage of the device and by the first commutating signal, the second commutating means comprising a control input receiving in operation the reference tracking window, while the second commutating circuit has an output terminal supplying a signal representative of the variation between the telemetry mark and the reference tracking window.

7. A telemetry device according to claim 5, wherein the second deviation detector comprises an analog gate having at least two control inputs respectively receiving in operation the pulse representative of the telemetry mark and the reference tracking window and two polarization inputs receiving the opposed d.c. voltages $+V$ and $-V$.

* * * * *